(12) United States Patent
Michael et al.

(10) Patent No.: US 9,504,212 B2
(45) Date of Patent: Nov. 29, 2016

(54) REAL TIME INJECTION FOR AGRICULTURAL SPRAYERS

(71) Applicant: Raven Industries, Inc., Sioux Falls, SD (US)

(72) Inventors: Nick Michael, Baltic, SD (US); Diane Miller, Sioux Falls, SD (US); Warren L. Thompson, Baltic, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 564 days.

(21) Appl. No.: 13/832,678

(22) Filed: Mar. 15, 2013

(65) Prior Publication Data

US 2014/0263705 A1   Sep. 18, 2014

(51) Int. Cl.
*A01G 25/16* (2006.01)

(52) U.S. Cl.
CPC ............. *A01G 25/16* (2013.01); *A01G 25/165* (2013.01)

(58) Field of Classification Search
CPC ............................ A01G 25/16; A01G 25/165
USPC ....... 239/159, 170, 407–417.5, 10, 310, 419
See application file for complete search history.

(56) References Cited

U.S. PATENT DOCUMENTS

| | | |
|---|---|---|
| 5,134,961 A | 8/1992 | Giles et al. |
| 5,337,959 A | 8/1994 | Boyd |
| 5,520,333 A * | 5/1996 | Tofte ..................... A01B 79/005 137/599.05 |
| 5,704,546 A | 1/1998 | Henderson et al. |
| 5,772,114 A | 6/1998 | Hunter |
| 5,884,224 A | 3/1999 | McNabb et al. |
| 5,913,915 A | 6/1999 | McQuinn |
| 5,919,242 A | 7/1999 | Greatline et al. |
| 5,931,882 A * | 8/1999 | Fick ..................... A01B 79/005 111/903 |
| 5,971,294 A * | 10/1999 | Thompson .............. B05B 12/04 239/163 |
| 5,978,723 A | 11/1999 | Hale et al. |
| 6,070,538 A | 6/2000 | Flamme et al. |
| 6,070,539 A | 6/2000 | Flamme et al. |
| 6,079,340 A | 6/2000 | Flamme et al. |
| 6,122,581 A | 9/2000 | McQuinn |
| 6,189,807 B1 | 2/2001 | Miller et al. |
| 6,199,000 B1 | 3/2001 | Keller et al. |
| 6,216,614 B1 | 4/2001 | Wollenhaupt |
| 6,230,091 B1 | 5/2001 | McQuinn et al. |
| 6,236,924 B1 | 5/2001 | Motz et al. |
| 6,522,948 B1 | 2/2003 | Benneweis |
| 6,606,542 B2 | 8/2003 | Hauwiller et al. |
| 6,678,580 B2 | 1/2004 | Benneweis |
| 6,698,368 B2 | 3/2004 | Cresswell |
| 6,708,080 B2 | 3/2004 | Benneweis |
| 6,776,355 B2 | 8/2004 | Ringer et al. |
| 6,877,675 B2 | 4/2005 | Benneweis |

(Continued)

*Primary Examiner* — Arthur O Hall
*Assistant Examiner* — Juan C Barrera
(74) *Attorney, Agent, or Firm* — Schwegman Lundberg & Woessner, P.A.

(57) ABSTRACT

A system comprises a distribution boom, a first pump device configured to provide a flow stream of a carrier substance for the distribution boom, a second pump device configured to supply a chemical substance into the flow stream of the carrier substance, and a control module. The distribution boom includes a plurality of boom sections. A boom section includes one or more dispensers, a mixing device configured to provide a combination of chemical and carrier to the one or more dispensers, and a control valve configured to supply the chemical substance to the mixing device. The control module is configured to individually control a rate of supply of the chemical substance to the boom section by the control valve.

20 Claims, 2 Drawing Sheets

(56) References Cited

U.S. PATENT DOCUMENTS

| | | |
|---|---|---|
| 7,395,769 B2 | 7/2008 | Jensen |
| 7,690,440 B2 | 4/2010 | Dean et al. |
| 7,694,638 B1 | 4/2010 | Riewerts et al. |
| 7,706,926 B2 | 4/2010 | Peterson |
| 7,848,865 B2 | 12/2010 | Di Federico et al. |
| 8,109,448 B2 * | 2/2012 | Giles ............... A01M 7/006 239/428 |
| 8,141,504 B2 | 3/2012 | Dean et al. |
| 8,186,288 B2 | 5/2012 | Chinkiwsky |
| 8,191,795 B2 | 6/2012 | Grimm et al. |
| 8,191,798 B2 | 6/2012 | Hahn et al. |
| 8,488,874 B2 | 7/2013 | Zaman et al. |
| 8,635,963 B2 | 1/2014 | Friggstad |
| 2002/0107609 A1 | 8/2002 | Benneweis |
| 2003/0070597 A1 | 4/2003 | Cresswell |
| 2010/0101469 A1 | 4/2010 | Landphair et al. |
| 2011/0054743 A1 | 3/2011 | Kocer et al. |
| 2011/0179984 A1 | 7/2011 | Beaujot et al. |
| 2012/0169495 A1 | 7/2012 | Kowalchuk |
| 2012/0174843 A1 | 7/2012 | Friggstad |
| 2012/0195496 A1 | 8/2012 | Zaman et al. |
| 2012/0211508 A1 | 8/2012 | Barsi et al. |
| 2012/0241533 A1 * | 9/2012 | Moeller ............. A01M 7/0089 239/1 |

* cited by examiner

US 9,504,212 B2

REAL TIME INJECTION FOR AGRICULTURAL SPRAYERS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc.; Sioux Falls, S. Dak. All Rights Reserved.

TECHNICAL FIELD

Embodiments pertain to agricultural sprayers. Some embodiments relate to distributing a substance from a storage container to a distribution boom.

BACKGROUND

Agricultural sprayers are used to distribute agricultural products such as fertilizers, insecticides, herbicides and fungicides to agricultural crops. The sprayers typically include one or more distribution booms that are long enough (e.g., 60 feet to 150 feet) to multiple rows of crops at one pass. Agricultural fields can be irregular in shape and contain contour changes and can additionally contain tree lines, hillsides, and ponds or streams. These irregularities can provide challenges in even distribution of the agricultural product and can lead to waste of the product. Additionally, the configuration of the agricultural sprayer itself may cause unwanted variation in application of the agricultural product. Thus there are general needs for systems and methods that improve application of agricultural products.

OVERVIEW

Systems, devices and methods for improved application of agricultural products are described herein. A system example includes a distribution boom, a first pump device configured to provide a flow stream of a carrier substance for the distribution boom, a second pump device configured to supply a chemical substance into the flow stream of the carrier substance, and a control module. The distribution boom can include a plurality of boom sections. A boom section can include one or more dispensers, a mixing device configured to provide a combination of chemical and carrier to the one or more dispensers, and a control valve configured to supply the chemical substance to the mixing device. The control module can be configured to individually control a rate of supply of the chemical substance to the boom section by the control valve.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As explained previously herein, it can be challenging to provide an optimized distribution of an agricultural product with an agricultural sprayer. Irregularities in an agricultural field can make it desirable to a user to apply an agricultural product differently at different positions along a distribution boom. Additionally, an agricultural sprayer system sometimes uses a carrier fluid (e.g., water). An agricultural product is then mixed with the carrier fluid in the agricultural sprayer and the mixed solution can be applied to agricultural crops. Variation in the mixed solution within a sprayer distribution system can lead to undesired variation in the agricultural product applied. Agricultural sprayers can include multiple wet booms that use multiple injection systems which can also cause variation due to mismatches among the injection systems of the multiple distribution booms.

Reducing lag time between injection of an agricultural chemical into the carrier fluid system and the time that a mixed solution of the chemical and carrier fluid is applied would reduce waste of the agricultural chemical. Spot spraying and on-the-go variation in chemical application rate would be desirable to manage spraying when field irregularities occur, as would changing a rate in application of the chemical along different locations of the distribution boom.

Figure 1:
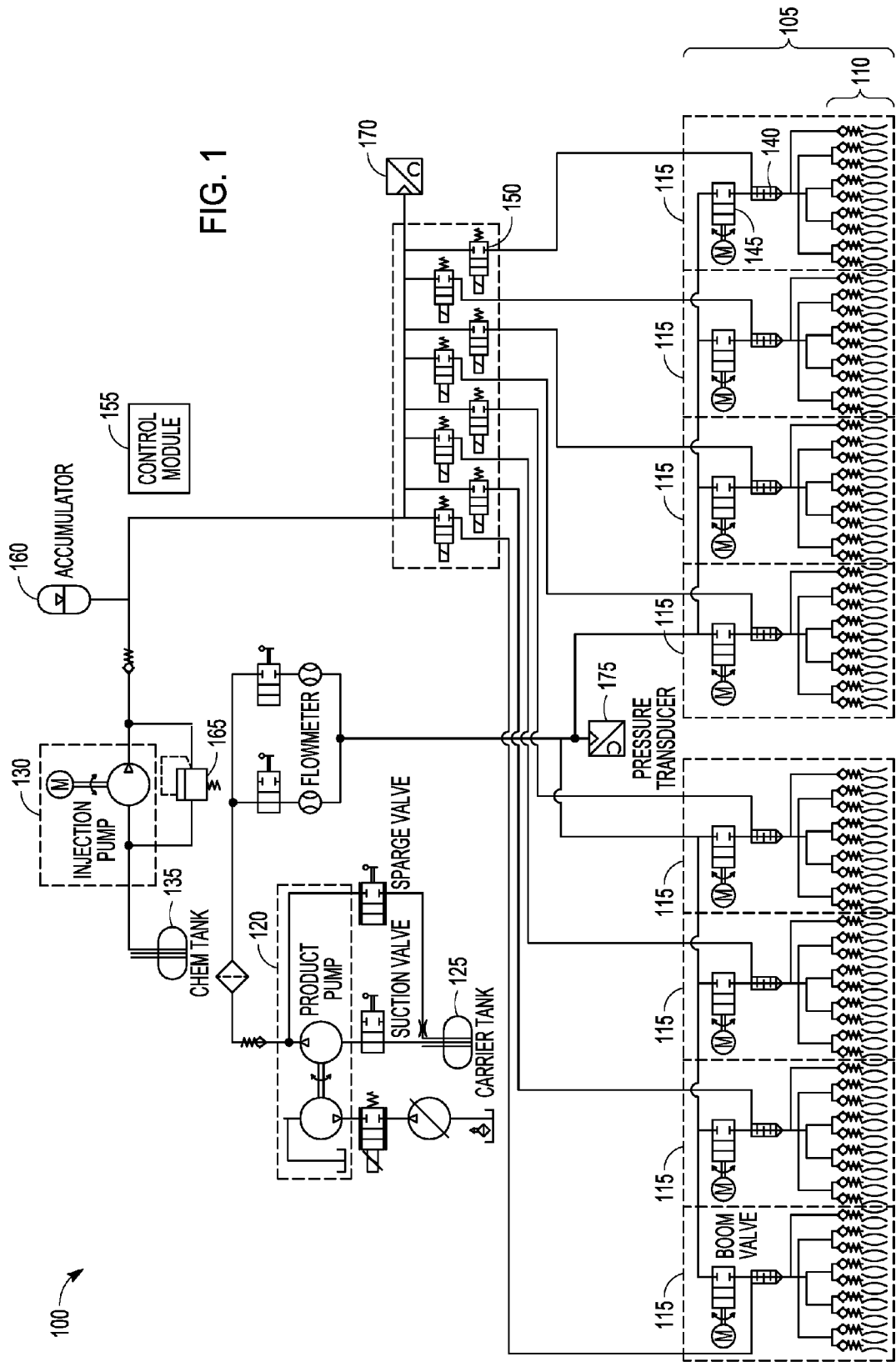
FIG. 1 is a diagram of an example of a system that provides real time injection of an agricultural product into an agricultural sprayer system.

FIG. 1 is a diagram of an example of a system 100 that provides real time injection of an agricultural product into an agricultural sprayer system. The system 100 includes a distribution boom 105. The distribution boom 105 distributes an agricultural product to an agricultural field. The distribution boom 105 can include multiple dispensers 110 for dispensing of the agricultural product. An example of a dispenser is a spray nozzle. Dispensers can be positioned or spaced apart at regular intervals along the distribution boom 105 to correspond with the position of rows of agricultural crops in the agricultural field. In an illustrative example, the distribution boom can be approximately 120 feet long with approximately 20 inch spacing between dispensers.

A carrier substance can be distributed through the distribution boom 105 to the dispensers 110. The system 100 can include a first pump device 120 that provides a flow stream of a carrier substance for the distribution boom 105. The carrier substance can be a liquid (e.g., water or a main agricultural fluid product such as liquid fertilizer) or a gas (e.g., air). The carrier flow stream can be sourced at a carrier storage container 125 (e.g., a storage tank) and end at the dispensers 110. A chemical substance can be injected or added to the carrier substance to provide the agricultural product that is distributed (e.g., sprayed) by the distribution boom 105. The system 100 can include a second pump device 130 configured to supply the chemical substance into the flow stream of the carrier substance. The chemical substance can also be a liquid or a gas. The chemical substance can be stored in a chemical storage container 135 separate from the carrier storage container 125. The combined carrier and chemical substance can be a fertilizer, herbicide, insecticide, or fungicide. Some examples of the first pump device 120 and the second pump device 130 include a positive displacement pump, a peristaltic pump, a centrifugal pump, a diaphragm pump and a vane pump.

To provide better control of the distribution of an agricultural product, the distribution boom 105 includes multiple boom sections. The example in the Figure shows eight boom sections, but the distribution boom can contain other numbers of boom sections (e.g., ten or sixteen boom sections). A boom section 115 includes one or more of the dispensers 110. The example in the Figure shows nine dispensers per boom section. A boom section 115 also includes a mixing device 140 or mixer (e.g., a two-input, one-output valve) that provides the combination of chemical and carrier to the dispensers 110 of the boom section 115. The dispensers can be arranged in tube/dispenser pairs connected to a junction at the output of the mixing device 140, or arranged as a single dispenser per tube. The tubing for a tube/dispenser may be larger (e.g., three eighths of an inch) than the tubing for a single dispenser (e.g., one quarter of an inch). A single mixing device for a section provides homogenous combination of the carrier and chemical for the whole boom section.

A boom section 115 may also include a boom valve 145 to supply the carrier substance to the mixing device 140. A boom section 115 includes a control valve 150 that supplies the chemical substance to the mixing device 140. Thus, the flow path for the chemical substance can include a single distribution point (the second pump device 130) and include multiple points of entry into the distribution boom 105 (at each boom section 115). Some examples of the control valves include a plunger valve, a ball valve, a globe valve and a spool valve.

The system 100 also includes a control module 155. The control module 155 can be an electronics unit that includes a processor (e.g., a microprocessor) interpreting or executing instructions in software or firmware to perform the functions described. The control module 155 may include hardware circuits or any combination of hardware, firmware and software. One or both of the control valves and the boom valves can be individually controllable by the control module 155. The control module 155 may individually activate one control valve at a time or activate multiple control valves in parallel.

The control module 155 can individually control a rate of supply of the chemical substance to a boom section by the control valve 150 of the boom section 115. The control module 155 can include a signal generator circuit (not shown) that provides an electrical signal to electrically control the control valve 150. For instance, a positive voltage amplitude of the electrical signal may enable the control valve. The control module 155 may control a control valve through pulse width modulation (PWM). The electrical signal can include a series of signal pulses. The electrical signal can include a duty cycle for the pulses in which the duty cycle determines an on time for the control valve (e.g., high voltage) and an off time or the control valve (e.g., low voltage). The control module 155 may alter a duty cycle of the signal pulses to control the rate of supply of the chemical substance to the boom section by the control valve. In some examples, the frequency of the pulses is within a range of two to four Hertz (2 Hz-4 Hz).

A control valve 150 may be controllable through a solenoid. The electrical signal can be used to generate a magnetic field to activate the solenoid and open the valve. If the solenoid is activated with a positive pulse, a negative pulse can be used to collapse the magnetic field and decrease the control valve close-time; allowing for more precise control of a solenoid-activated control valve.

Figure 2:
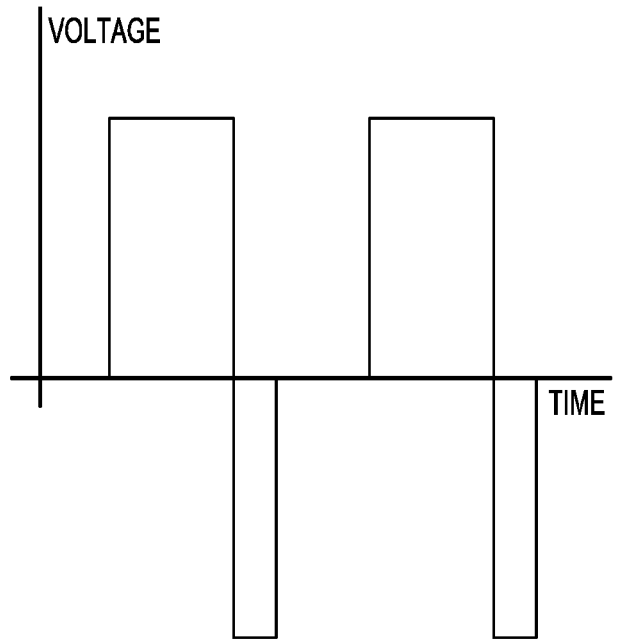
FIG. 2 shows an example of a signal waveform used to drive a control valve.

FIG. 2 shows an example of a PWM signal to drive the control valves. The positive portion of a pulse opens the control valve 150 and the negative portion of the pulse is used to quickly close the valve. Narrowing the positive portion of the pulse or pulses reduces the on time of the control valve, and widening the positive portion of the pulse increases the on time of the control valve. If the solenoid is activated with a negative pulse, a positive pulse can be used to collapse the magnetic field and turn the control valve off more quickly. In some examples, the open-time for a control valve is approximately four milliseconds (4 ms) and the close-time for a control valve is approximately five milliseconds (5 ms).

As explained previously herein, the control module 155 can individually activate one control valve at a time. In certain examples, the control module 155 activates the valves one at a time (e.g., consecutively) to reduce the load on the power supply and dampen any pressure spikes that may be introduced by the second pump device 130 (e.g., a positive displacement pump having a reciprocating piston). If all of the valves are fired at once, a large pulse in flow may occur and cause uneven distribution of the product by the distribution boom 105. Dampening the pressure spikes can improve even distribution of the agricultural product. In certain examples, the control module 155 consecutively activates the valves within a boom section 115.

The system 100 can include an accumulator container 160 or accumulator configured to receive chemical substance in response to pressure produced by the second pump device 130 that exceeds a specified pressure threshold value. In certain examples, the specified pressure threshold value is twenty-five pounds per square inch (25 psi). The accumulator absorbs pulsations produced by the second pump device 130.

The system 100 can include a pressure sensing device 170 (e.g., a pressure transducer) that provides an indication (e.g., an electrical signal) representative of pressure of the chemical substance at one or more of the control valves. The control module 155 adjusts flow of the second pump device 130 according to the indication from the pressure sensing device. The system 100 may also include a second pressure sensing device 175 that monitors pressure of the carrier flow stream. The control module 155 adjusts flow of the first pump device 120 according to the indication from the pressure sensing device. Thus system 100 can include feedback control of pressure in the carrier and chemical flow streams. In some examples, the pressure provided at an outlet has a maximum pressure in the range of 10 psi-150 psi, with a typical range of 15 psi-60 psi. The control pressure range can be set to 20 psi-80 psi above the outlet pressure.

The system 100 can include a pressure relieving device 165 (e.g., a pressure relief valve) in fluid communication with the second pump device 130. The pressure relieving device 165 can be activated when pressure of the flow stream exceeds a pressure rating of the second pump device 130. The pressure relieving device 165 protects the second pump device in the event of an over-pressure condition when the pressure of the system exceeds a maximum pressure of the second pump device.

Figure 3:
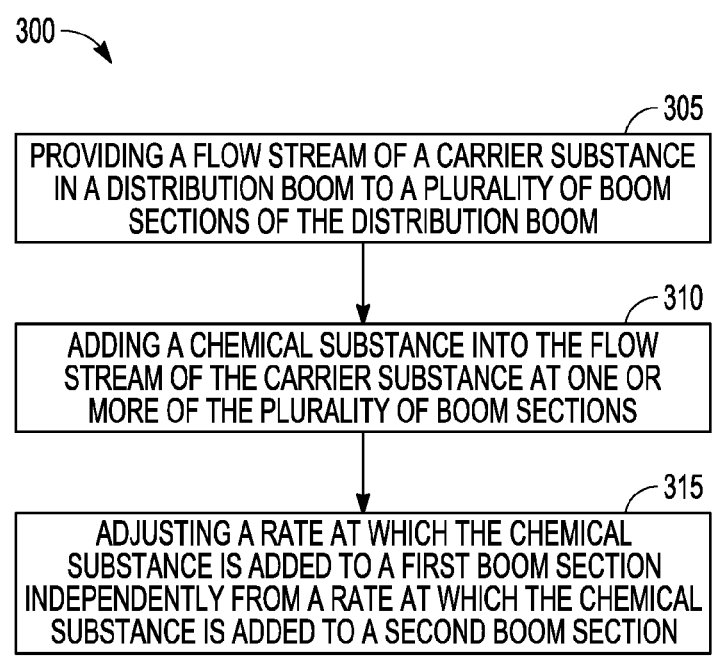
FIG. 3 is flow diagram of a method to provide real time injection of an agricultural product into an agricultural sprayer system.

While the system 100 can be included in multiple distribution booms, dividing one distribution boom into separate boom sections provides improved application of agricultural products with only one distribution boom 105. This may allow the system to be mountable to a drive vehicle (e.g., a tractor). The dispensers 110 can be spray nozzles arranged on distribution boom to distribute the combined carrier and chemical substance in rows in response to movement of the drive vehicle. The system 100 can also be mountable to a trailing vehicle that is pulled by a leading vehicle. The spray nozzles are arranged on the distribution boom 105 to distribute the combined carrier and chemical substance in rows in response to movement of the trailing vehicle FIG. 3 is flow diagram of a method 300 to provide real time injection of an agricultural product into an agricultural sprayer system. At block 305, a flow stream of a carrier substance is provided in a distribution boom. The flow stream is provided from a storage container for the carrier substance to a plurality of boom sections of the distribution boom.

At block 310, a chemical substance is added into the flow stream of the carrier substance at one or more of the plurality of boom sections. The chemical and the carrier can be liquids or gases. The combined substance is an agricultural product that is mixed at the boom sections and applied to an agricultural field by the dispensers of the boom sections. The chemical can be injected into a flow path for the chemical at one entry point and can be mixed at the boom sections. This provides a homogenous chemical substance at each of the boom sections. Mixing at the boom sections can reduce the lag time between injection of the chemical into the carrier and application of the combined agricultural product. To inject the chemical substance, a pump device can be used to create a positive pressure difference between a flow path for the chemical substance and the flow stream of the carrier substance.

At block 315, a rate at which the chemical substance is added to a first boom section is adjusted independently from a rate at which the chemical substance is added to a second boom section. Some examples of application rates include a medium range of 0.4 to 10 ounces of product per minute per valve (oz/min/valve) and a high range of 2 to 50 oz/min/valve.

Separate adjustable boom sections allows for the rate of application to be varied by central control at different positions along the distribution boom. Having separate adjustable boom sections also allows for separate individual activation of boom sections by central control. This improved control of an agricultural applicator provides for spot spraying and on-the-go variation in the rate of application, without using additional distribution booms or changing system hardware.

ADDITIONAL NOTES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system comprising:
   a distribution boom;
   a first pump device configured to provide a flow stream of a carrier substance for the distribution boo;
   a second pump device configured to supply a chemical substance into the flow stream of the carrier substance; and
   a control module,
   wherein the distribution boom includes a plurality of boom sections, wherein a boom section includes:
   one or more dispensers;
   a mixing device configured to provide an initial combination of chemical and carrier substance to the one or more dispensers; and
   a control valve configured to supply the chemical substance to the mixing device, wherein the control module is configured to individually duty cycle on and off times of the control valves of the plurality of boom sections to control a rate of supply of the chemical substance to individually adjust a combination of carrier and chemical independently for each boom section.

2. The system of claim 1, wherein the control module includes a signal generator circuit configured to provide an electrical signal to the control valves of the plurality of boom sections, wherein the control module is configured to control the rate of supply of the chemical substance to the boom sections by the control valves using pulse width modulation of the electrical signal.

3. The system of claim 2, wherein the electrical signal includes a series of pulses that include at least one positive amplitude pulse and at least one negative amplitude pulse.

4. The system of claim 1, including a pressure relieving device in fluid communication with the second pump device, wherein the pressure relieving device is activated when pressure of the flow stream exceeds a pressure rating of the second pump device.

5. The system of claim 1, including a pressure sensing device configured to provide an indication representative of pressure of the chemical substance at one or more control valves, wherein the control module is configured to adjust flow of the second pump device according to the indication.

6. The system of claim 1, including an accumulator container configured to receive chemical substance in response to pressure produced by the second pump device that exceeds a specified pressure threshold value.

7. The system of claim 1, wherein a dispenser includes a spray nozzle and wherein the distribution boom includes a plurality of spray nozzles spaced apart along the distribution boom to distribute a combined carrier and chemical substance.

8. The system of claim 7, wherein the system is configured to be mountable to a drive vehicle, and wherein the spray nozzles are arranged on distribution boom to distribute the combined carrier and chemical substance in rows in response to movement of the drive vehicle.

9. The system of claim 7, wherein the system is configured to be mountable to a trailing vehicle that is pulled by a leading vehicle, and wherein the spray nozzles are arranged on distribution boom to distribute the combined carrier and chemical substance in rows in response to movement of the trailing vehicle.

10. The system of claim 1, wherein the carrier substance is a fluid and wherein the system includes a first storage container to store the fluid carrier substance, and a second storage container to store the chemical substance separate from the fluid carrier substance.

11. The system of claim 1, wherein the carrier substance and the chemical substance are in a gaseous state.

12. A method comprising:
   providing a flow stream of a carrier substance in a distribution boom using a first pump device, wherein the flow stream is provided from a storage container configured to store the carrier substance to a plurality of boom sections of the distribution boom;
   adding a chemical substance into the flow stream of the carrier substance at the plurality of boom sections via a mixing device configured to provide an initial combination of chemical and carrier substance to the plurality boom sections; and
   using a control valve configured to supply the chemical substance to the mixing device to adjust a rate at which the chemical substance is added to a first boom section independently from a rate at which the chemical substance is added to a second boom section by independently duty cycling on and off tires of the control valves of the first and second boom sections.

13. The method of claim 12, wherein adjusting a rate at which the chemical substance is added to a boom section includes controlling a control valve at the boom section using pulse width modulation (PWM).

14. The method of claim 13, wherein controlling a control valve includes controlling a solenoid-activated control valve using PWM, wherein the PWM provides at least one positive amplitude pulse and at least one negative amplitude pulse to the solenoid-activated control valve.

15. The method of claim 12, wherein adding a chemical substance into the flow stream of the carrier substance at one or more of the plurality of boom sections includes adding the chemical substance to one boom section at a time.

16. The method of claim 12, wherein adding a chemical substance into the flow stream of the carrier substance includes using a second pump device to create a positive pressure difference between a flow path for the chemical substance and the flow stream of the carrier substance, and wherein the method includes dampening pressure pulses caused by action of the pump device.

17. The method of claim 12, wherein providing a flow stream of a carrier substance in a distribution boom includes providing a flow stream of a carrier fluid in the distribution boom.

18. The method of claim 12, wherein providing a flow stream of a carrier substance in a distribution boom includes providing a flow stream of a carrier gas in the distribution boom.

19. An apparatus comprising:
   means for providing a flow stream of a carrier substance in a distribution boom, wherein the flow stream is provided from a storage container of the carrier substance to a plurality of boom sections of the distribution boom;
   a mixing device configured to provide initial combination of a chemical substance and carrier substance to the plurality of boom sections;
   a plurality of control valves for the plurality of boom sections, wherein the control valves are configured to supply the chemical substance into the mixing device to mix with the flow stream of the carrier substance at the plurality of boom sections; and
   means for independently duty cycling on and off times of the control valves of a first boom section and a second boom section to adjust a rate at which the chemical substance is added to the first boom section independently from a rate at which the chemical substance is added to the second boom section to adjust a combination of carrier and chemical independently for the first and second boom sections.

20. The apparatus of claim 19, including means for dampening pressure pulses resulting from adding the chemical substance into the flow stream of the carrier substance.

\* \* \* \* \*

UNITED STATES PATENT AND TRADEMARK OFFICE
CERTIFICATE OF CORRECTION

| | | |
|---|---|---|
| PATENT NO. | : 9,504,212 B2 | Page 1 of 1 |
| APPLICATION NO. | : 13/832678 | |
| DATED | : November 29, 2016 | |
| INVENTOR(S) | : Michael et al. | |

It is certified that error appears in the above-identified patent and that said Letters Patent is hereby corrected as shown below:

In Column 7, Line 5, in Claim 1, delete "boo;" and insert --boom;--, therefor

Signed and Sealed this
Eighth Day of May, 2018

Andrei Iancu
*Director of the United States Patent and Trademark Office*